T. CHARLTON.
APPARATUS FOR SEPARATING MATERIALS OF DIFFERENT SPECIFIC GRAVITY.
APPLICATION FILED MAY 4, 1914.
1,365,815.  Patented Jan. 18, 1921.
5 SHEETS—SHEET 4.
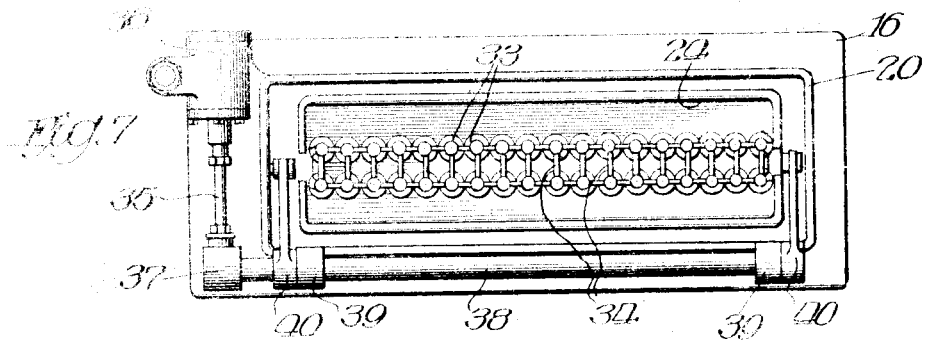
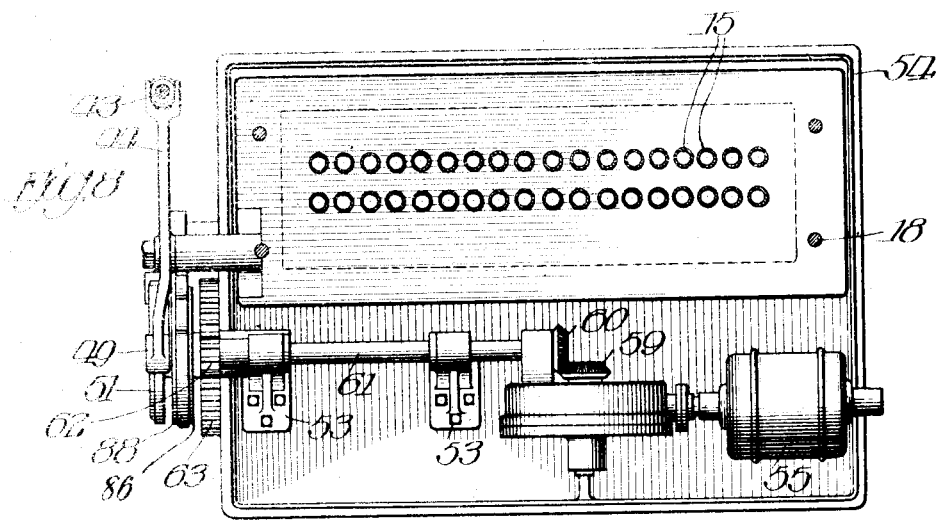
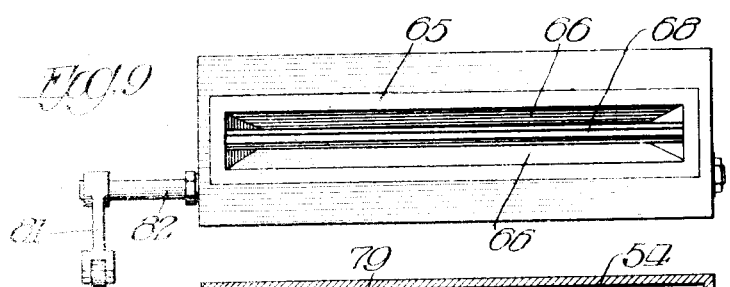
Witnesses:
Inventor
Thomas Charlton

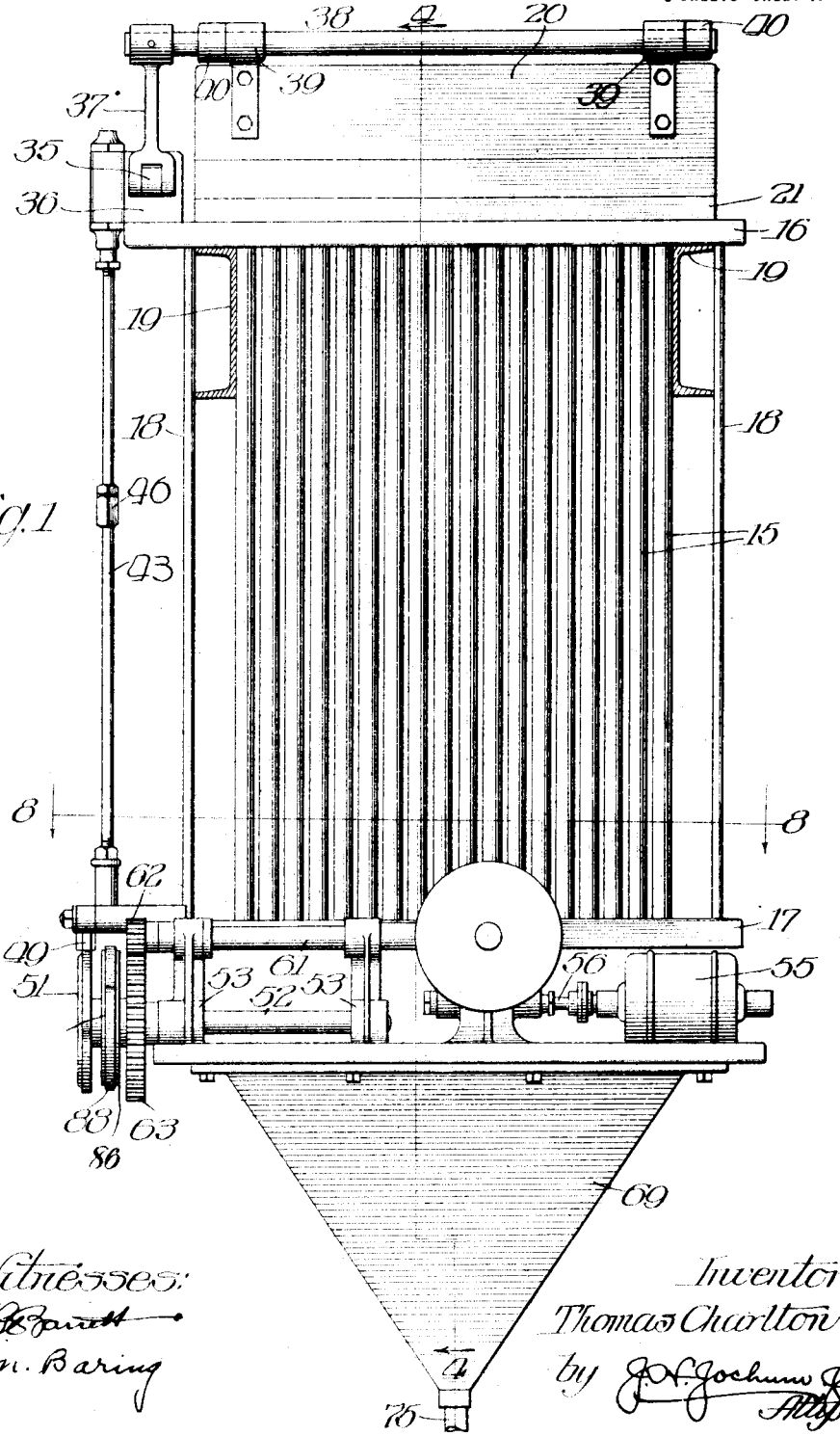

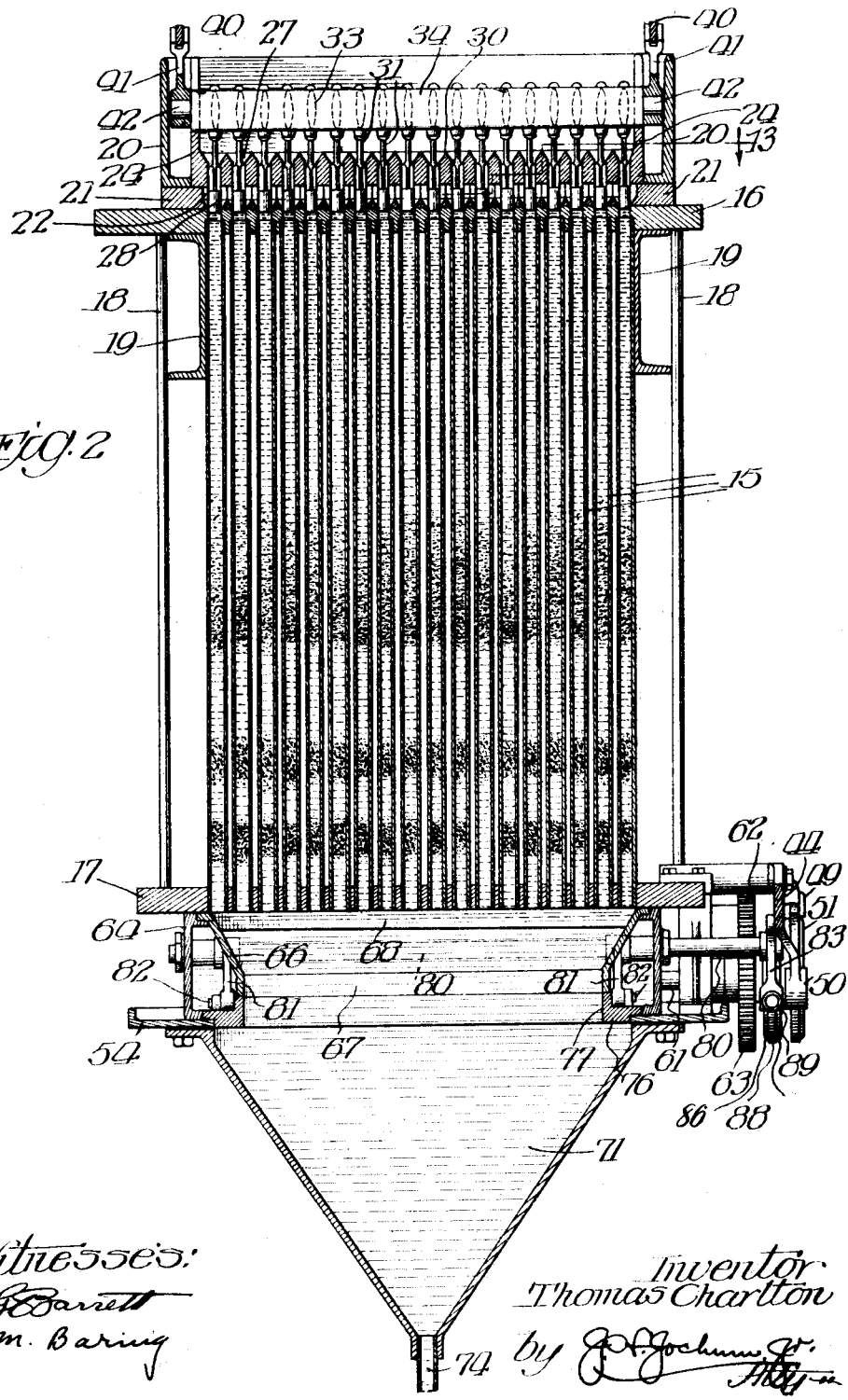

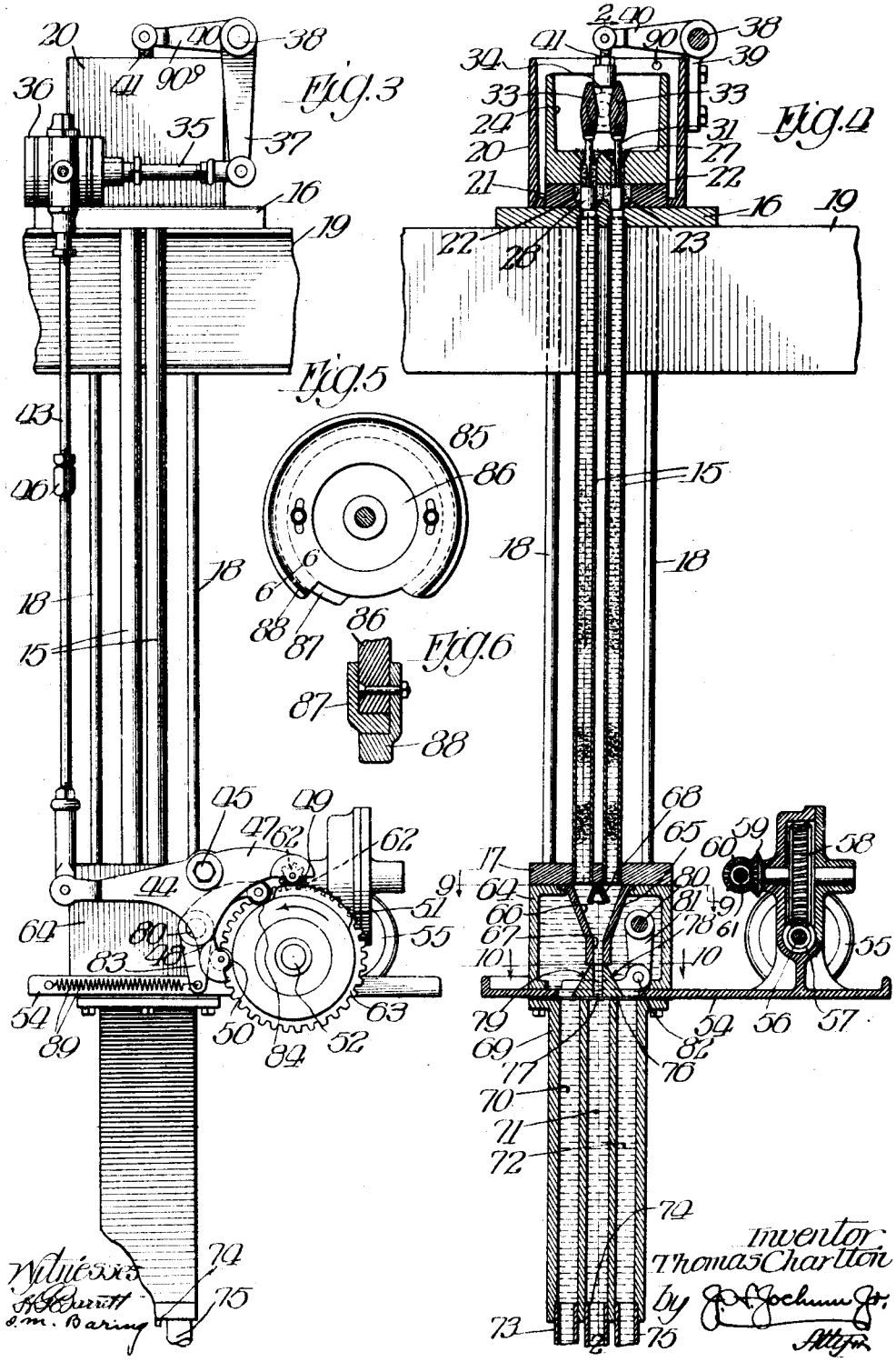

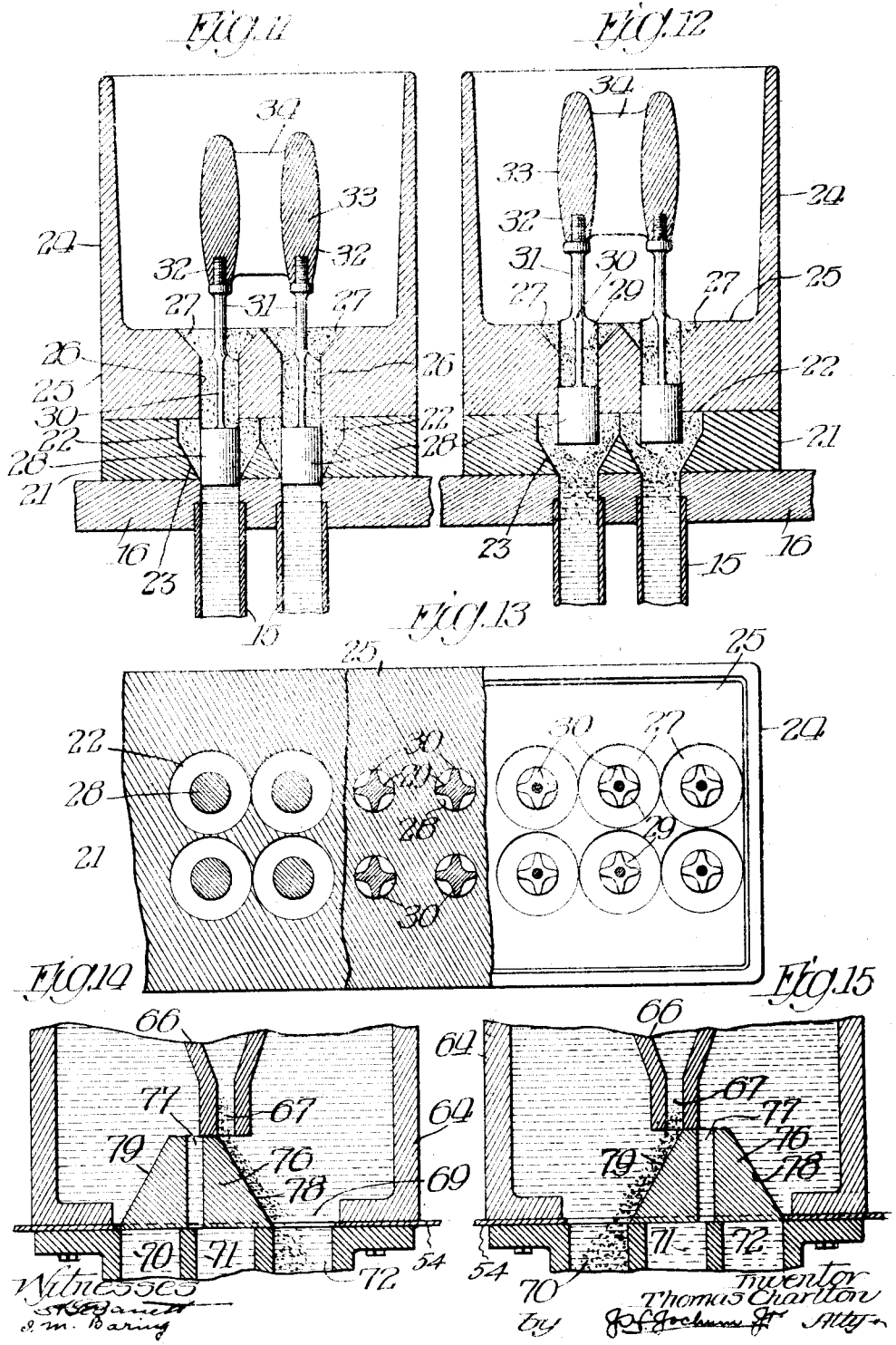

UNITED STATES PATENT OFFICE.

THOMAS CHARLTON, OF CHICAGO, ILLINOIS.

APPARATUS FOR SEPARATING MATERIALS OF DIFFERENT SPECIFIC GRAVITY.

1,365,815.   Specification of Letters Patent.   Patented Jan. 18, 1921.

Application filed May 4, 1914. Serial No. 836,075.

*To all whom it may concern:*

Be it known that I, THOMAS CHARLTON, a citizen of the United States, residing at Chicago, in the county of Cook and State of Illinois, have invented certain new and useful Improvements in Apparatus for Separating Materials of Different Specific Gravity, of which the following is a specification.

This invention relates to improvements in apparatus for separating materials of different specific gravity, of the type wherein the material is first reduced to a pulp and then introduced into a plurality of unit separators containing a quiescent and non-circulating liquid, such for example as water, of less specific gravity than the material to be separated, so that the pulp after being introduced into each separator, will settle through the water, and automatically divide or separate by gravity into the ingredients of which it is composed. According to the natural law, the velocities at which the several ingredients of equal size will settle through the water, will correspond to their specific gravities, the heaviest being at the bottom and the lighter at the top, and one of the objects of this invention is to provide improved means for intermittently feeding to the separator units the pulp to be separated.

A further object is to provide a machine of this character having means for directing the different elements to their respective collecting chambers.

A further object is to provide an improved machine of this character, which will be simple, durable, compact and cheap in construction, and effective, efficient and automatic in action.

To the attainment of these ends, and the accomplishment of other new and useful objects as will appear, the invention consists in the features of novelty in substantially the construction, combination and arrangement of the several parts hereinafter more fully described and claimed and shown in the accompanying drawings illustrating the invention, and in which—

Figure 1 is a front elevation of an improved machine of this character constructed in accordance with the principles of this invention.

Fig. 2 is a vertical longitudinal sectional view as taken on line 2—2, Fig. 4.

Fig. 3 is a left hand end elevation of Fig. 1.

Fig. 4 is a vertical longitudinal sectional view taken on line 4—4, Fig. 1.

Fig. 5 is a detail front elevation of the cam for controlling the cut off or directing device for the separated ingredients.

Fig. 6 is a detail sectional view taken on line 6—6, Fig. 5.

Fig. 7 is a detail top plan view of Fig. 3 showing the receiving hopper for the pulp.

Fig. 8 is a sectional view taken on line 8—8, Fig. 1.

Fig. 9 is a detail top plan view taken on line 9—9 Fig. 4.

Fig. 10 is a sectional view taken on line 10—10 Fig. 4.

Fig. 11 is an enlarged detail sectional view of the pulp receiving tank, showing the cut offs to the units, in one position.

Fig. 12 is a view similar to Fig. 11 showing the cut offs in another position.

Fig. 13 is an enlarged detail irregular section taken on line 13—13, Fig. 2.

Fig. 14 is an enlarged detail sectional view showing the cut off or directing member for the separated elements in one position to discharge the gangue.

Fig. 15 is a view similar to Fig. 14, showing the cut off or directing member for the separated elements in another position, to discharge the lead, or other heavier element.

Referring more particularly to the drawings and in the present exemplification of this invention, the numeral 15 designates a plurality of separator units which are preferably cylindrical in cross section, and the length of the units varies according to the size of the pulp to be separated, inasmuch as the velocity of the pulp through the units will be in proportion to the size of the pulp. Taking a complex lead zinc ore for example, the 16 mesh size will require a machine having separator units approximately 7 feet in length, while the same ore pulp of 100 mesh can be effectively separated in a machine having units of about 18 inches in length. These units may be arranged in any suitable manner with respect to each other and are arranged vertically and provided with open upper and lower ends. The upper extremities of these units are connected with a member 16 and the lower extremities are connected with a similar member 17, the two members being tied together by means of connecting bars or rods 18, and the parts thus formed may be supported in any desired or suitable manner such as by means of supports 19 preferably in the form of channel irons and upon which the member 16 rests, so that the units 15 will stand between the supports.

Supported by the member 16 is a tank or hopper 20, the bottom of which is preferably formed by a member 21 having a series of openings 22 therethrough, registering with the upper extremities of the separator units 15, one for each of the units. These openings 22 are preferably of a size somewhat larger than the diameter of the units 15, to form pockets for collecting the material and the walls of the openings adjacent the bottoms thereof and at points adjacent the extremities of the units are beveled or inclined as at 23, so as to direct the material into the units at the proper time.

Arranged within the tank 20 is another tank or hopper 24, which preferably rests upon the member 21, and the bottom 25 of this tank 24 is provided with openings 26 therethrough which register with the openings 22 and the upper portions of the openings 26 are enlarged as at 27, the walls of these openings being beveled or inclined as shown more clearly in Figs. 11 and 12, so as to direct the material from the tank 24 into the openings 26, through these openings into the openings 22 and finally into the units 15.

Movable in each of the openings 26 is a cut off preferably in the form of a plug or valve, having a cylindrical body portion 28, of a size to fit and move freely in the opening 26. A portion of this plug is provided with a series of grooves 29 formed preferably by means of spaced longitudinal ribs 30, and the extremity of the cut off is shaped into a stem 31 having a threaded portion 32 which is threaded into a portion 33 of a grid designated generally by the reference numeral 34. The grid 34 is of a size considerably smaller than the size of the tank or receptacle 24 and comprises two longitudinal portions connected by spaced cross bars so as not to interfere with the distribution of the pulp into the tank or receptacle 24.

The plugs or cut offs 28 are preferably arranged in pairs, and the units 15 are also preferably arranged in pairs, although any arrangement may be adopted.

The material to be separated is deposited into the tank or receptacle 24 and when deposited, assuming the cut offs 28 to be in their lowered position, as shown in Fig. 11, the material will flow into the openings 26 in the bottom 25 of the tank, through the passages 29 of the cut off formed between the ribs 30 and into the openings 22 to be confined therein and will accumulate until the cut offs 28 are raised or moved into the position shown in Fig. 12. This will release the material and it will then flow from the openings 22 into the units 15 and at the same time the cutoffs will close the outlets of the openings 26 to prevent a further supply of pulp to the openings 22 until the cutoffs are again lowered.

The cut offs or plugs 28 are intermittently raised and lowered at predetermined intervals, so as to allow one charge or supply of pulp to accumulate in the openings or pockets 22 while another charge is flowing through the units 15 and being separated, thereby intermittently supplying charges to the units, and the pulp is supplied to the tank or receptacle 24 in any suitable manner.

The plugs or cut offs 28 are adapted to be raised in any suitable manner, preferably by means of a piston rod or plunger 35 which is connected with a piston movable in a cylinder 36, and the rod is also connected with an arm 37 which in turn is connected with a rock shaft 38 journaled in suitable bearings 39, and spaced arms 40 are connected with the rock shaft 38 and preferably extend over the tank or hopper 20. These arms 40 are connected by means of suitable links or connections 41 with trunnions 42 carrying the grid 33, so that when the shaft 38 is rocked by the movement of the piston rod 35, the cut offs 28 will be raised or lowered according to the direction of movement of the shaft 38, thereby discharging a supply of material to the units 15, and again closing the entrance to the units to accumulate another charge, while the first charge is passing through the units. With this construction of feeding mechanism it will be seen that the material to be separated is allowed to drop into the pockets around the cutoffs 28, a sufficient time having elapsed between the closing and opening of the pocket for the collection of the material to be separated and at the same time the material will be thoroughly saturated with the liquid. At the proper time the cutoffs are automatically raised from their seats or moved away from the outlet opening of the pockets, this will permit the material which has been collected in the pockets to enter the separating column or unit at the same instant and under the most favorable conditions so as to permit the elements of greatest specific gravity to force their way through the lighter elements and travel in the column of liquid in the separator unit in their own respective zones, and in a condition to be deflected or directed into the proper collector adjacent the outlet of the separator units in a perfectly separated condition.

The pockets having communication with the separating units, also contain quiescent liquid and the cutoffs being moved away from the seats to open the pocket, the material in the pocket will be delivered to the unit and any effect of the agitation in the supply tank, upon the material in the pockets and the liquid in the separating units will be voided.

Furthermore, as the cutoffs are moved toward their seats to close the pockets there will be no material in advance of the cutoffs through which the valve would have to be forced so as to be properly seated upon the valve seat.

This operation also prevents agitation of the liquid in the separating units. The piston and piston rod 35 are actuated in any suitable manner preferably by means of a fluid, and the direction of movement of the piston rod is controlled by a valve, (not shown), in the cylinder and which valve is shifted by means of a rod 43, which is connected to a lever 44 pivoted as at 45, and which lever is located preferably adjacent the member 17.

A turn buckle 46 may be provided in the rod 43 for adjustment purposes, and the lever 44 is provided with spaced arms 47, 48 to which arms are connected anti-friction rollers 49, 50. These anti-friction rollers are adapted to be engaged by a cam 51 secured to a shaft 52.

The shaft 52 is journaled in suitable bearings 53 mounted upon a support 54, and the shaft 52 is driven by means of a member 55, the shaft 56 of which is provided with a worm gear 57 meshing with a worm 58 and connected with the worm 58 is a bevel gear 59 which latter meshes with a bevel gear 60 on a shaft 61, and connected with the shaft 61 is a pinion 62 which meshes with a gear 63 secured to the shaft 52.

Thus when the motor is operating, the gear 63 and the cam 51 will be rotated and the valve in the cylinder 56 will be shifted longitudinally in one direction and then in the other to raise and lower the cut offs or plugs 28.

Obviously the gears may be of any desired ratio.

The tank or receptacle 24 and the units 15 are maintained, in any desired or suitable manner, full of water in a quiescent condition and when the pulp is discharged into the units, the ingredients of the same size, as they flow through the units will be separated, by their specific gravity, and the units are of a length to permit this separation.

By the time the material reaches the bottom of each unit, it will be separated into its different ingredients, and the ingredient of the greatest specific gravity will be far enough in advance of the next element to permit of its being directed into its respective chamber, while the cut off, to be hereinafter described, will be properly positioned to properly direct the succeeding elements.

In order therefore, to separate the different ingredients and collect them in the different receptacles, all that is necessary is to catch or trap them as they pass out of the units and for that purpose there is provided a chamber 64 arranged at the bottom of the units preferably between the member 17 and the support 54.

Arranged within this chamber is a funnel shaped member 65, the upper end of which is arranged directly below the units 15 so that the material will be discharged into the funnel shaped member. The inclined sides 66 of this member 65 terminating in a reduced portion 67, forming the exit of the funnel shaped member, are preferably of a length to extend across the entire series of units 15.

In order to equalize the fall of the material from the units into the member 65, a distributer or equalizer 68 is provided, preferably in the form of an inverted triangular shaped member, which is arranged to extend across the series of units and in a position to be engaged by the ingredients as they pass out of the units.

This funnel shaped member 66 and the chamber 64 are also maintained full of quiescent liquid and the chamber 64 is provided with an outlet 69 with which a plurality of passages 70, 71, 72 have communication, and these passages are also maintained full of quiescent liquid. Leading from the passages are a series of conductors 73—74—75 which conduct the different ingredients to any point desired.

The ingredients fall from the units successively into the member 66 and in order to deflect the respective ingredients and direct them to their respective collectors, there is provided a cut off or valve 76 preferably in the form of a frustum of a cone, and the valve is provided with a central passage 77 adapted to be brought into register with the passage 67 of the member 66. The cut off or valve 76 is disposed some distance from the ends of the units and outside of the units, so that its operation will not disturb the quiescent condition of the liquid in the units, and is of such a construction that the accumulation of the separate ingredients will also be effected outside of the units, so that the liquid in the units will not be agitated. Furthermore the chamber 64 is of such a size and capacity that the operation or movement of the valve or cut-off 76 will not agitate or disturb the quiescent condition of the liquid in the separating units 15 or in the receiver 65. The cut-off valve is of a length to extend across the opening 67 and is adapted when in the position shown in Fig. 4 to direct the ingredient into the central passage 71. When in the position shown in Fig. 14, the inclined side 78 will direct the ingredient into the passage 72 and when in the position shown in Fig. 15, the inclined side 79 will direct the ingredient into the passage 70. Therefore, it will be manifest that in order to direct the ingredients into the proper collectors or receptacles, it is only necessary to control the movement of the cut off or valve 76. This is accomplished in any suitable manner, preferably by means of a rock shaft 80 journaled in suitable supports, and to which rock shaft arms 81 are connected and these arms 81 are pivotally connected as at 82 with the cut off 76.

The shaft 80 is rocked by means of a lever 83 connected therewith and one end of this lever is provided with an anti-friction roller 84 adapted to travel upon a cam designated generally by the reference numeral 85 and which preferably comprises a body 86 having two or more concentric cam elements 87, 88, adjustably secured thereto. This cam is rotated in the same manner as the cam 51, and an elastic member 89 is connected with the lever 83 and anchored to a fixed support and tends normally to hold the anti-friction roller 84 in engagement with the cam and also to return the cut off 86 to its normal position. It will be noted that the anti-friction roller will operate successively on the cam surfaces formed by the portion of the body 86 and the cams 87, 88 and these surfaces are so arranged that the cut off 76 will be maintained in intervals of rest in the proper positions to direct the ingredients into the respective passages 70, 71 and 72.

When the cam operates to move the cut off 76 into the position shown in Fig. 15, the heaviest ingredient will be discharged down the inclined face 79 and into the passage 70. After this ingredient has been thus discharged, another cam surface will rock the lever 83 into the position shown in Fig. 4 to allow the next heaviest ingredient, (zinc), to be discharged through the passage 77 and into passage 71. At the proper interval the cam will again operate on the lever 83 and position the cut off 76 as shown in Fig. 14 so that the remaining ingredient or gangue will be discharged down the inclined face 78 and into the passage 72. After the gangue has been thus discharged, the cam will assume a position to permit the elastic member 89 to return the cut off 76 to the position shown in Fig. 15 which is the normal position thereof, to discharge the next supply of lead into its proper receptacle. Obviously by adjusting the cams 87 and 88 with respect to each other, the timing or adjusting of this cut off 76 may be varied to suit the existing conditions.

The tank 20 will be provided with a suitable discharge 90, (see Fig. 4).

It will thus be manifest that this machine is entirely automatic in its operation and after having once been started, will continue to operate without any attention, so long as the pulp is being supplied thereto, and the pulp may be supplied in any manner to the receptacle 24.

The manner of supplying the pulp, and the manner of maintaining the units 15 together with the chamber 64 and the passages 70, 71 and 72 full of quiescent water, forms no part of the present invention, and it is therefore, not necessary to illustrate the same, suffice it to say, however, that they are so maintained.

While in the present form of the invention, the preferred form and construction have been herein shown and described, it is to be understood that many changes may be made in the details of construction and in the combination and arrangement of the several parts without departing from the spirit of this invention.

What is claimed as new is:—

1. In a machine for separating materials of different specific gravities, an upright open ended tubular settling chamber substantially filled with quiescent liquid of less specific gravity than the material, and having a discharge outlet, a chamber communicating with the outlet and also substantially filled with the liquid, means operable in proximity to the said outlet and within the second recited chamber for controlling the separated elements, and means also within the second recited chamber registering with the settling chamber outlet and said operable means, whereby disturbance in the settling chamber due to the operation of the said controlling means will be avoided.

2. In a machine for separating materials of different specific gravities, an upright open ended tubular separating chamber substantially filled with quiescent liquid of less specific gravity than the material, means for intermittently delivering to the chamber the material to be separated, means for controlling the discharge of the separated ingredients from the chamber, the second said means embodying a receptacle having an opening communicating with the separating chamber and a discharge opening, collecting receptacles for the separated materials, a cutoff operating between the outlet opening of the separating chamber and the inlet openings of the said collecting receptacles, to open one when it closes the other, provisions whereby disturbance in the separating chamber due to the movement of the said cutoff will be avoided, and means for automatically actuating the said cutoff.

3. In a machine for separating materials of different specific gravities, an upright open ended tubular settling chamber substantially filled with quiscent liquid of less specific gravity than the material, a chamber in communication with the lower end of the settling chamber and substantially filled with the liquid, means for intermittently delivering to the chamber, the material to be separated, means embodying a shiftable cutoff for directing the different elements from the chamber in a separated condition, and means within the second recited chamber whereby disturbance in the settling chamber due to the movement of the said cutoff will be avoided.

4. In a machine for separating materials of different specific gravities, an upright open ended tubular separating chamber substantially filled with quiescent liquid of less specific gravity than the material, means controlling the inlet to the chamber and operating to automatically open and close the inlet to intermittently deliver to the chamber a supply of material to be separated, a chamber in communication with the outlet end of the separating chamber and being also substantially filled with said liquid, means within the second said chamber for controlling the separated ingredients, and means also within the second said chamber establishing communication between the outlet of the separating chamber and said last mentioned means, whereby disturbance in the separating chamber due to the movement of the said controlling means will be avoided.

5. In a machine for separating materials of different specific gravities, an upright open ended tubular separating chamber substantially filled with quiescent liquid of less specific gravity than the material, a chamber in communication with the lower end of the separating chamber and also substantially filled with said liquid, means controlling the inlet to the chamber and operating to alternately open and close the inlet to intermittently deliver to the chamber a supply of material to be separated, automatically operating means within the second said chamber and coöperating with the outlet of the chamber for controlling the discharge of the ingredients in the order of their specific gravities, and means also within the second said chamber registering with the settling chamber outlet and said automatically operating means whereby disturbance in the separating chamber due to the movement of the said controlling means will be avoided.

6. In a machine for separating materials of different specific gravities, a separating chamber open at both ends and containing quiescent liquid of less specific gravity than the material, a chamber in communication with the lower end of the separating chamber and also filled with said liquid, means operating to intermittently supply the material to the separating chamber, a cutoff operating in the second said chamber for controlling the discharge of the separated ingredients from the chamber, means within the second said chamber registering with the discharge outlet of the settling chamber and said cutoff, whereby disturbance in the separating chamber due to the movement of the cutoff will be avoided, means for actuating the cutoff at predetermined intervals with respect to the discharge of the ingredients from the chamber, and means for varying the time of actuation of the cutoff with respect to such discharge.

7. In a machine for separating materials of different specific gravities, a separating chamber open at both ends and containing a quiescent liquid of less specific gravity than the material, a chamber in communication with the outlet end of the separating chamber and also substantially filled with said liquid, means operating to intermittently supply the material to the separating chamber, a cutoff operating in the second said chamber for controlling the discharge of the separated ingredients from the separating chamber, mechanism common to the said means and the said cutoff for actuating them, and means interposed between the outlet end of the separating chamber and the said cutoff whereby disturbance in the separating chamber due to the movement of the cutoff will be avoided.

8. In a machine for separating materials of different specific gravities, a chamber containing a quiescent liquid of less specific gravity than the material, means operating to collect a supply of material adjacent the inlet of the chamber and intermittently deliver the supply of material to the chamber, the said means embodying means for collecting a supply while one supply is passing through the chamber, means for automatically collecting the separated materials from the chamber in the order of their specific gravities, the last said means operating independently of and remote from the outlet of the chamber, a chamber communicating with the separating chamber and also substantially filled with said liquid and having an outlet opening, and a cutoff within the second said chamber and operating between the said outlet and the second said collecting means, whereby disturbance in the separating chamber due to the movement of the said cutoff will be avoided.

9. In a machine for separating materials of different specific gravities, a chamber containing a quiescent liquid of less specific gravity than the material, means operating to intermittently deliver a supply of material to the chamber, the said means embodying means for collecting a supply while one supply is passing through the chamber, and means for automatically collecting the separated materials from the chamber in the order of their specific gravities, the last recited means embodying a chamber communicating with the first said chamber and substantially filled with said liquid, a shiftable deflector operating in the second said chamber and separated from the first said chamber, and means intermediate the deflector and the first said chamber whereby disturbance in the first said chamber due to the movement of the said deflector will be avoided.

10. In a machine for separating materials of different specific gravities, a separating chamber containing a quiescent liquid of less specific gravity than the material, means operating to intermittently supply material to the chamber, a series of collectors for receiving the separated materials from the chamber, and a chamber intermediate the collectors and the first said chamber and having communication with both, the intermediate chamber being also substantially filled with said liquid, means separated from the first said chamber and automatically operating to direct the materials in the order of their specific gravities into their respective collectors, and means intermediate the said chambers whereby disturbance in the separating chamber due to the movement of the second said means will be avoided, the second said means being provided with portions individual to the collectors for directing the material thereinto, the said portions being always maintained in proximity to the respective receptacles in any position of the second said means.

11. In a machine for separating materials of different specific gravities, a separating chamber containing a quiescent liquid of less specific gravity than the material, means operating to intermittently supply the material to the chamber, a series of collectors for receiving the separated material from the chamber, a chamber intermediate the collectors and the first recited chamber and having communication with both, means automatically operating in the intermediate chamber to direct the materials in the order of their specific gravities into their respective collectors, the last recited means embodying a shiftable cutoff coöperating with the collectors, operating in the intermediate chamber and separated from the separating chamber, a chamber intermediate the separating chamber and the collectors and having communication with both, the intermediate chamber being also substantially filled with the liquid, and means establishing communication between the cutoff and the discharge outlet of the settling chamber coöperating with the cutoff whereby disturbance in the separating chamber due to the movement of the cutoff will be avoided.

12. In a machine for separating materials of different specific gravities, a plurality of open ended upright tubular units containing a quiescent liquid of less specific gravity than the material, a chamber communicating with the open end of said units and also substantially filled with the liquid, means for intermittently delivering material to the units and embodying means individual to the inlets of the units for opening and closing them, means for actuating the last recited means, automatically operating means common to but separated from the outlet of the units and operating in said chamber for controlling the discharge of the materials in the order of their specific gravities, and means intermediate establishing communication between the last said means and the units, whereby disturbance in the units due to the movement of the said intermediate means will be avoided.

13. In a machine for separating materials of different specific gravities, an upright settling chamber containing a quiescent liquid of less specific gravity than the material, a receiver for receiving the separated materials from the chamber, and having inclined walls, means for equalizing the fall of the materials into the receiver, and means for collecting the materials from the receiver in the order of their specific gravities.

14. In a machine for separating materials of different specific gravities, an upright settling chamber containing a quiescent liquid of less specific gravity than the material, a receiver for receiving the separated materials from the chamber, and having inclined walls, a deflector for the materials within the receiver, said deflector having inclined walls opposed to the inclination of the walls of the receiver for equalizing the fall of the materials into the receiver, and means for collecting the materials from the receiver in the order of their specific gravities.

15. In a machine for separating materials of different specific gravities, an upright tubular separating unit substantially filled with a quiescent liquid of less specific gravity than the material to be separated and having an inlet and an outlet, a chamber in communication with said unit and also substantially filled with said liquid, means for intermittently supplying to the unit the material to be separated, the length of the separator unit necessary to be provided for the material to flow through the liquid to effect separation being proportionate to the size of the material to be separated, means operable in the said chamber and in proximity to the outlet for controlling the different elements in a separated condition, and means adjacent the outlet of the said unit and with which last said means the said controlling means coöperates to avoid disturbance in the settling unit due to the operation of the said controlling means.

16. In a machine for separating materials of different specific gravities, an upright settling chamber open at its upper end, and substantially filled with quiescent liquid, of less specific gravity than the material to be separated, a receptacle adjacent the upper end of the chamber and having an outlet communicating with the inlet of the chamber to form a passage for the material from the receptacle into the chamber, said passage having an enlarged portion in which the material accumulates, a cutoff movable in the passage, said cutoff being of a size less than the said enlarged portion of the passage but of a size that when actuated will alternately open and close the inlet of the chamber, and means for actuating the cutoff.

17. In a machine for separating materials of different specific gravities, an upright settling chamber, means for supplying thereto the material to be separated, said chamber having a discharge outlet, a receiving chamber through which the separated materials pass directly they leave the settling chamber, means providing a reduced outlet for the settling chamber, said receiving chamber having a delivery outlet, a cutoff adjacent and coöperating with the outlet of the receiving chamber and spaced from the outlet of the said settling chamber for controlling the discharge of the separated ingredients, and means for actuating the said cutoff.

18. In a machine for separating materials of different specific gravities, an upright settling chamber, means for supplying thereto the material to be separated, said chamber having a discharge outlet, a receiving chamber having a delivery outlet and through which chamber the separated materials pass directly they leave the settling chamber, a cutoff adjacent and coöperating with the outlet of the said receiving chamber for controlling the discharge of the separated ingredients, said receiving chamber being of a size to reduce or avoid disturbance in the settling chamber due to the movement of the cutoff, means for automatically actuating the said cutoff, and means for intermittently delivering the material to the said settling chamber.

19. In a machine for separating materials of different specific gravities, a plurality of separating chambers containing quiescent liquid of less specific gravity than the materials, a chamber in communication with the separating chambers and also substantially filled with said liquid, means operating to supply the material to the chambers, a series of collectors for receiving the separated materials from the chambers, means automatically operating to direct the materials in the order of their specific gravities into the respective collectors, the last said means embodying a shiftable cutoff coöperating with the collectors and common to all of the said separating chambers, and means interposed between the separating chambers and the collectors and with which last said means the cutoff also coöperates to avoid disturbance in the separating chamber due to the movement of the said cutoff.

20. In a machine for separating materials of different specific gravities, a plurality of separating chambers containing quiescent liquid of less specific gravity than the material, a chamber in communication with the separating chambers and also substantially filled with the said liquid, means operating to supply the material to the separating chambers, a series of collectors for receiving the separated material from the separating chambers, means automatically operating in the said chamber communicating with the said separating chambers to direct the materials in the order of their specific gravities into the respective collectors, the last said means embodying a shiftable cut-off disposed between the collectors and the chambers and spaced from the latter, and means adjacent the outlets of said separating chambers and with which the last recited means, the cut-off operates to avoid disturbance in the separating chamber due to the movement of said cut-off.

21. In a machine for separating materials of different specific gravities, an upright separating chamber substantially filled with a quiescent liquid of different specific gravity from the materials to be separated, a chamber in communication with the outlet of the separating chamber and also substantially filled with said liquid, means providing a reduced outlet for the separating chamber and extending into the second said chamber, and means operable in proximity to the said outlet for controlling the separated elements as they are discharged, the first recited means operating to avoid disturbance in the separating chamber due to the operation of the said controlling means.

22. In a machine for separating materials of different specific gravities, an upright separating chamber substantially filled with quiescent liquid of different specific gravity from the material to be separated, a chamber with which the said unit communicates and also substantially filled with said liquid, means providing a reduced outlet for the separating chamber and constituting a second chamber within and substantially smaller than the first said chamber, the second said chamber having an inlet communicating with the first said chamber, a cutoff communicating with said outlet of the second said chamber to control the separated elements discharged therefrom, the second said chamber operating to prevent disturbance in the first recited chamber due to the actuation of the cutoff.

23. In a separating machine, an upright open ended tubular separating unit substantially filled with quiescent liquid of less specific gravity than the material, a feeding tank for a supply of material and having communication with the inlet, and means adjacent the lower end of the unit for controlling the separated ingredients discharged therefrom, said tank having a pocket at its point of communication with the separating unit, a cutoff for controlling the outlet of the pocket, said cutoff being adapted to be reciprocated in the pocket and being of a size smaller than the pocket to form with the wall of the pocket when the pocket is closed, a chamber for collecting the material, and means for reciprocating the cutoff.

24. In a separating chamber, an upright open ended tubular separating unit substantially filled with quiescent liquid of less specific gravity than the material, a feeding tank for a supply of the material and having communication with the inlet, and means adjacent the lower end of the unit for controlling the separated ingredients discharged therefrom, said tank having a pocket at its point of communication with the separating unit, a cutoff for controlling the outlet of the pocket, said cutoff being adapted to be reciprocated in the pocket and being of a size smaller than the pocket to form with the wall of the pocket when the pocket is closed, a chamber for collecting the material, and means for reciprocating the cutoff, said collecting chamber being entirely submerged and disposed at a point between the separating unit and the source of supply, whereby the collected material in the pocket will be unaffected by any agitation in the supply tank.

25. In a separating machine, an upright open ended tubular separating unit substantially filled with quiescent liquid of less specific gravity than the material, a feeding tank for a supply of material and having communication with the inlet, and means adjacent the lower end of the unit for controlling the separated ingredients discharged therefrom, said tank having a pocket at its point of communication with the separating unit, a cutoff for controlling the outlet of the pocket, said cutoff being adapted to be reciprocated in the pocket and being of a size smaller than the pocket to form with the wall of the pocket when the pocket is closed, a chamber for collecting the material, and means for reciprocating the cutoff, said collecting chamber being entirely submerged and disposed at a point between the separating unit and the source of supply, whereby the collected material in the pocket and the quiescent condition of the liquid in the separating unit will be unaffected by any agitation in the supply tank.

26. In a separating machine, an upright open ended tubular separating unit substantially filled with quiescent liquid of less specific gravity than the material, a feeding tank for a supply of material and having communication with the inlet, and means adjacent the lower end of the unit for controlling the separated ingredients discharged therefrom, said tank having a pocket at its point of communication with the separating unit, and also containing said liquid, said pocket having a valve seat adjacent its point of communication with the unit, a valve movable in the pocket and adapted to coöperate with the seat to close communication between the pocket and unit, said valve being of a size somewhat smaller than the pocket to form a collecting receptacle adjacent the valve when the latter is seated, means for moving the valve away from its seat to permit the collected material to enter the unit, and provisions whereby the collected material in the pocket and the quiescent condition of the liquid in the unit will be unaffected by any agitation in the supply tank.

27. A machine for separating materials of different specific gravities, embodying an upright passage substantially filled with quiescent liquid, and having an inlet and an outlet, means adjacent the outlet for controlling the discharge of the separated ingredients, and means adjacent the inlet for supplying the material to the passage, the last said means embodying a supply holder having an accumulation pocket for the material adjacent the inlet, said pocket also containing said liquid, means movable in the pocket for cutting off and establishing communication between the pocket and passage.

28. A machine for separating materials of different specific gravities, embodying an upright passage substantially filled with quiescent liquid, and having an inlet and an outlet, means adjacent the outlet for controlling the discharge of the separated ingredients, and means adjacent the inlet for supplying the material to the passage, the last recited means embodying a supply holder having communication with the passage, said supply holder also containing liquid, means intermediate the supply holder and passage for controlling the delivery of the material into the passage, and provisions whereby disturbance in the passage due to the movement of the last said means will be avoided.

29. In a machine for separating materials of different specific gravities, a settling chamber substantially filled with quiescent liquid of less specific gravity than the material to be separated, means providing a reduced outlet for the settling chamber, a second chamber substantially filled with quiescent liquid and communicating with said reduced outlet, means in said second chamber and operable in proximity to the said outlet for controlling the discharge of the separated elements; the reduced outlet and the second chamber functioning to avoid disturbances in the settling chamber due to the movement to said means operable in the second chamber.

In testimony whereof I have signed my name to this specification, in the presence of two subscribing witnesses, on this 2nd day of May, A. D. 1914.

THOMAS CHARLTON.

Witnesses:
    CHANNING L. SENTZ,
    J. H. JOCHUM, Jr.